(No Model.)

W. LUCAS.
LOAD LIFTER.

No. 313,087. Patented Mar. 3, 1885.

Witnesses.
J. B. Fetherstonhaugh
Jas. P. Maybee

Inventor
Wm Lucas
by
Donald C. Ridout & Co.

UNITED STATES PATENT OFFICE.

WILLIAM LUCAS, OF MARKDALE, ONTARIO, CANADA.

LOAD-LIFTER.

SPECIFICATION forming part of Letters Patent No. 313,087, dated March 3, 1885.

Application filed October 30, 1884. (No model.)

*To all whom it may concern:*

Be it known that I, WILLIAM LUCAS, of the village of Markdale, in the county of Grey, in the Province of Ontario, Canada, banker, have invented certain new and useful Improvements in Load-Lifters; and I do hereby declare that the following is a full, clear, and exact description of the same.

The invention relates to that class of load-lifters arranged to elevate the entire load. This is effected by a bar or shaft suitably journaled near the roof of the barn or other building in which the load is to be elevated, which bar or shaft is provided with two pairs of ropes or chains, one pair of ropes extending to a point where they can be connected to hooks on the end of the wagon-body, the other pair extending horizontally over the bar or spindle to sheave-pulleys journaled in the barn opposite to the point where their respective ropes are attached. Each of the other ropes, after passing over its pulley, descends to a point where it is connected to a bar or scantling, arranged to be slipped underneath the wagon-box or load. Both pairs of ropes thus connected are arranged to wind simultaneously round the bar or shaft, journaled near the roof of the building, when the said shaft is caused to revolve by a single rope passing round a grooved pulley attached to the shaft; and a further object of the present invention is to provide a suitable friction-clutch for gripping the single rope and sustaining the load at any desired point of elevation; and it consists, essentially, in passing the said rope round peculiarly arranged and formed rollers contained within a box capable of being fastened to the floor of the building, or to any other suitable point, substantially as hereinafter more particularly explained.

Figure 1:
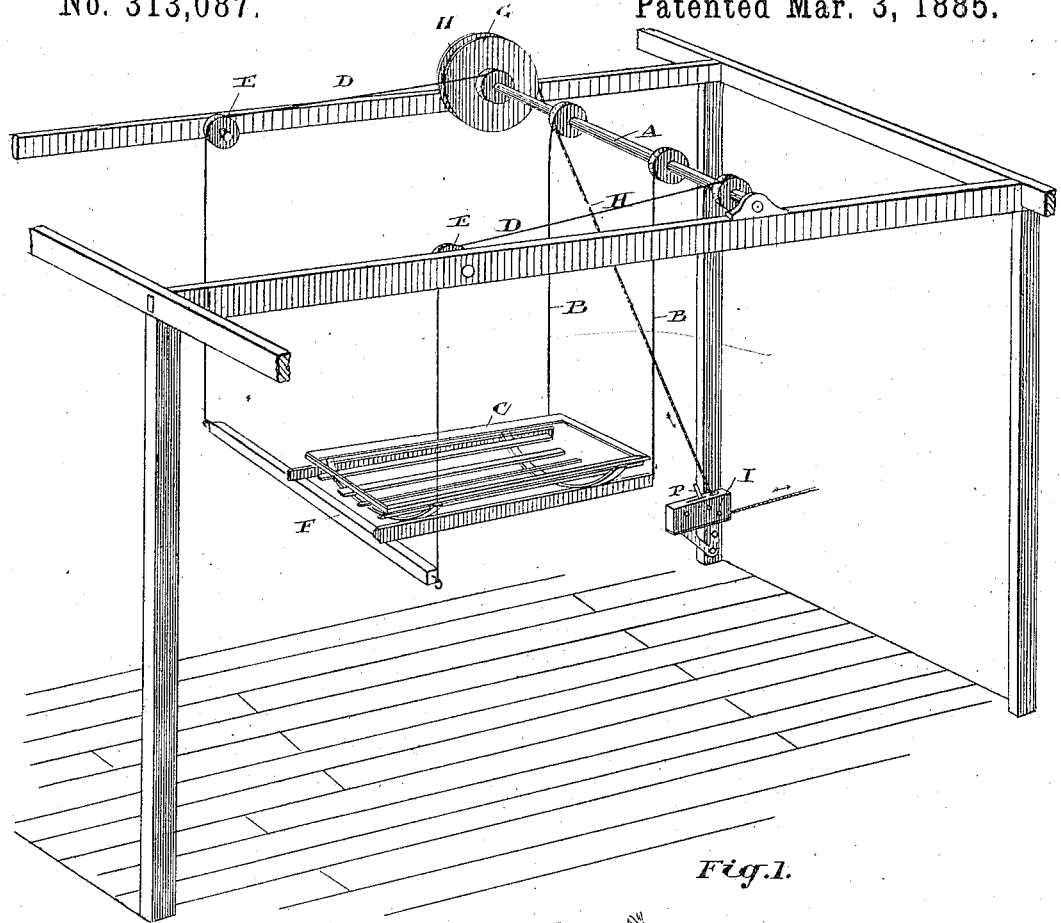
Figure 2:
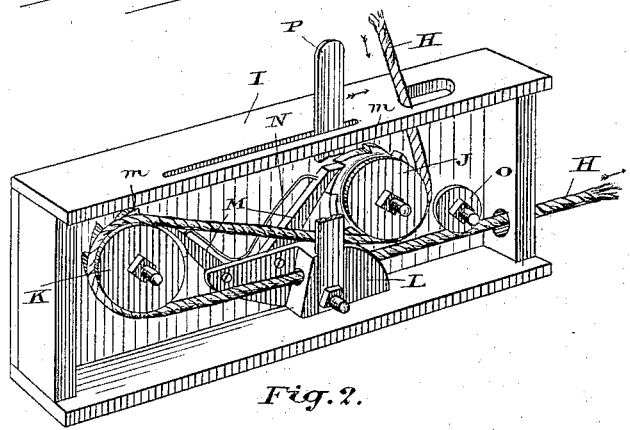

Figure 1 is a perspective view of a load-lifter provided with my improvements. Fig. 2 is an enlarged sectional detail of the box containing the friction-rollers for gripping the elevator-rope.

A is the bar or shaft suitably journaled in the upper portion of the frame of the building, as indicated.

B are two ropes attached to the bar A, and descending to the body C of the wagon, where they are connected, as indicated, to the side rails of the bottom of the body C. D are two smaller ropes, likewise fastened to the shaft A, and extending horizontally to the sheave-pulleys E, which are located, as indicated, opposite to the point where their respective ropes are attached to the shaft. After passing round the sheave-pulleys E the ropes D descend and are connected at their lower end to the bar or scantling F. This bar, it will be noticed, is longer than the width of the body C, so that the points where the ropes are connected to it are brought immediately below the sheave-pulleys E. By thus carrying one end of the load on a scantling longer than the width of a load a clear space is left behind the wagon; consequently my load-lifter is able to raise loads of different lengths.

G is a grooved pulley keyed or otherwise fastened to the shaft A. Around the groove of this pulley is wound a cord or rope, H; consequently when this rope is drawn upon so as to unwind it off the pulley G the shaft A is caused to revolve, and the ropes B and D are correspondingly wound round the shaft as the rope H is unwound off the grooved pulley G; consequently the load is lifted by drawing upon the rope H.

In order to prevent the load thus being elevated from falling should the lifting-power be removed from the said rope, and also to enable the load to be suspended at any point with the view of giving the horse employed as the power an opportunity to rest, I provide a friction-box, I, illustrated in detail in Fig. 2. This box is fastened to the bottom of the building, or it may be secured in any other desired position, so long as it is convenient to the rope H, in order that the said rope may be carried through it, as indicated. As the rope H enters the box I it first passes round the bottom of the grooved roller J, then round the grooved roller K, and thence through a hole made in the pivoted block L.

M are pawls pivoted on the back of the block L, and arranged to engage with ratchet-teeth *m*, formed in the back of the grooved rollers J and K, a spring, N, being placed for the purpose of holding the pawls M into gear with the said ratchet-teeth. After passing through the hole in the pivoted block L the rope H passes out at the end of the box I, and is then connected to the horse or other power intended to operate the load-lifter. A small grooved pulley, O, is placed between the end of the box I and the grooved roller J, so as to form a friction guiding-roller for the rope H. So long as the rope H is drawn in the direction indicated by arrow—that is to say, so long as power is applied to the said rope for the purpose of elevating the load—the grooved rollers J, K, and O form almost frictionless guides for the said rope H; but the moment that the draft is reversed—that is to say, by the removal of the lifting-power and consequent strain caused by the load supported by the rope—the said reversed strain causes the pivoted block L to tilt on its pivot, thereby throwing the said block toward the roller J and gripping the rope H between the said block L and the periphery of the roller J, and consequently the rope will be held in the desired position. The ratchet-teeth $m$ on the rollers J and K, by coming in contact with the pawls M, prevent the said rollers from revolving; consequently the additional friction thus produced assists in restraining the motion of the rope.

With the view of permitting the rope to be drawn back after the load has been elevated, I provide a lever, P, which is attached to the block L, and extends through the box I, so that by pressing it in the direction indicated by arrow the block L will be held clear of the rope passing between it and the roller J; consequently the said rope may be drawn freely back.

What I claim as my invention is—

1. A shaft, A, carried in suitable bearings at an elevated point in a barn or other building, and having attached to it the ropes B and D, the sheave-pulleys E, and bar or scantling F, in combination with the grooved pulley G, having wound upon it the rope H, which is carried round the grooved rollers J and K, and the pivoted block L, contained within the box I, the whole being arranged and operating substantially as and for the purpose specified.

2. As an improved clutch, the rollers J and K, having ratchet-teeth $m$, in combination with the pivoted block L, carried on the pawls M, the whole being arranged and operating substantially as and for the purpose specified.

3. The ropes B, wound around sheaves on the shaft A, and arranged to be connected at their ends to the body C, and the ropes D, also wound around sheaves on the shaft A, and connected to the scantling F, which is longer than the width of the body C, in combination with the rope H, wound around the pulley G, and controlled by a frictional device, substantially as and for the purposes described.

WILLIAM LUCAS.

In presence of—
E. G. LUCAS,
J. R. MACINTYRE.